United States Patent [19]

Matsubayashi et al.

[11] Patent Number: 5,038,065
[45] Date of Patent: Aug. 6, 1991

[54] PERMANENT MAGNET REVERSIBLE SYNCHRONOUS MOTOR

[75] Inventors: Jun Matsubayashi; Fumio Tajima, both of Ibaraki; Kunio Miyashita, Hitachi; Kazuaki Takada, Katsuta; Kuniaki Kubokura; Eiji Toyoda, both of Hitachi, all of Japan

[73] Assignees: Hitachi, Ltd., Tokyo; Hitachi Taga Engineering, Ltd., Ibaraki, both of Japan

[21] Appl. No.: 349,494

[22] Filed: May 9, 1989

[30] Foreign Application Priority Data

May 13, 1988 [JP] Japan .................. 63-114697

[51] Int. Cl.⁵ ............................................. H02K 21/14
[52] U.S. Cl. ..................................... 310/162; 310/156
[58] Field of Search .................. 310/162, 156, 42; 29/598

[56] References Cited

U.S. PATENT DOCUMENTS

| 4,486,678 | 12/1984 | Olson | 310/156 |
| 4,543,506 | 9/1985 | Kawada et al. | 310/156 |
| 4,700,097 | 10/1987 | Kawada et al. | 310/162 |

FOREIGN PATENT DOCUMENTS

| 128961 | 12/1984 | European Pat. Off. | |
| 2062486 | 7/1972 | Fed. Rep. of Germany | 310/156 |
| 2376240 | 7/1978 | France | |
| 186966 | 11/1982 | Japan | 310/156 |

Primary Examiner—Steven L. Stephan
Assistant Examiner—D. L. Rebsch
Attorney, Agent, or Firm—Antonelli, Terry, Stout & Kraus

[57] ABSTRACT

A rotor of a permanent magnet type synchronous motor facing a stator having a number of slots comprises a rotor core fixed to a motor shaft and an even number of permanent magnets in a circumferential direction of the rotor core. Projecting portions are formed in the shape of a protruding portion of the rotor core over each permanent magnet. The width (A) of each projecting portion is different from the pitch (B) of the slots of the stator. A position detector for detecting the permanent magnet position of the rotor comprises detectors of the normal rotation and other detectors of the reverse rotation. These detectors are arranged having predetermined phase differences ($\alpha$, $\beta$) to a center line. A pattern generating circuit is provided for switching the conducting position to the stator winding corresponding to the phase differences.

11 Claims, 8 Drawing Sheets

PERMANENT MAGNET REVERSIBLE SYNCHRONOUS MOTOR

FIELD OF THE INVENTION

The present invention relates to a permanent magnet type synchronous motor, and more particularly to a permanent magnet type synchronous motor which has a rotor with projecting poles suitable for reducing the electric current used when the motor is accelerated or decelerated, and which is suitable to obtain low cogging torque.

BACKGROUND OF THE INVENTION

Conventional permanent magnet type synchronous motors in which some portions of an iron core are protruded among the poles of permanent magnets of the rotor are disclosed, for instance, in FIGS. 1(a), 1(b) and 1(c) of Japanese Patent Laid-Open No. 62-155796 (1987) published on July 10, 1987 entitled "Height Power Factor Control Method of Permanent Magnet Type Synchronous Motor" and FIGS. 1 to 4 of Japanese Utility Model Laid-Open No. 62-88463 published on June 5, 1987 entitled "Rotor of Permanent Magnet Type Synchronous Motor". These publications discuss an optimum ratio of the direct axis inductance of the rotor to the quadrature axis inductance thereof to be set at the time of positive utilization of reluctance torque in a current controlling 180° electric PWM control system in which the lead and lag of current phase are controlled in accordance with the magnitude of an amperage detected by a current sensor provided therein so as to detect the electric current flowing to the motor.

The circuit of a motor thus constructed and applied to an industrial sewing machine is shown in FIG. 1. FIG. 1 shows a permanent magnet type synchronous motor 1 (which will hereinafter be referred to as motor), magnetic pole sensor 2 adapted to detect the magnetic pole position of the motor 1, encoder 3 adapted to detect the rotational speed and direction of the motor 1, driving circuit 4 for the motor 1, which normally works as an inverter driving circuit and is driven by a normal rotation instruction 13 or a reverse rotation instruction 14 from a speed-position control circuit 5, operational speed instruction circuit 6, sewing machine 7 constituting a load, needle position sensor 8 for the sewing machine 7 which is adapted to normally detect two positions, i.e. the lower and upper positions of the needle, a signal processing circuit 9 adapted to determine the rotational speed (revolution numbers) in the normal rotational and reverse rotational directions on the basis of a detected original signal from the encoder 3 and output a signal to the speed-position control circuit 5, and a sewing machine control circuit 10 associated with the function of the sewing machine and adapted to drive the sewing machine 7 in accordance with a signal from a sewing machine operating instruction circuit 11 which is energized by a sewing command signal from an operator. The motor 1 and sewing machine 7 are connected together by a belt, and this motor 1 is of a 120° feed PWM voltage control system. Reference numeral 12 denotes a belt connecting the motor 1 and sewing machine 7 together.

When a sewing command from the operator is sent to the sewing machine operating instruction circuit 11 with an operational speed command to the operational speed instruction circuit 6, a signal is sent from the sewing machine control circuit 10 to the speed-position control circuit 5 so as to operate the motor 1 in accordance with the speed command. The speed-position control circuit 5 selects at the acceleration time a normal rotational mode on the basis of an operation command signal to accelerate the motor 1 by the driving circuit 4 at a voltage command level which is 120° feed pulse width controlled, and enter into a steady operation. During this time, a stator winding to which an electric current is to be selectively applied is determined by processing a signal from the magnetic pole sensor 2 by the speed-position control circuit 5, and a plurality of selected transistors in the inverter are turned on in accordance with a signal from this circuit 5, so that a winding current flows.

A signal obtained from the encoder 3 and representative of an actual speed of the motor 1 is fe back to the speed-position control circuit 5 and sewing machine control circuit 10, and the operational speed is in agreement with this signal and a speed command applied from the operational speed instruction circuit 6 to the control circuit 5 by a foot pedal (not shown).

After a predetermined sewing step in a sewing machine has been finished, to stop the operation of the sewing machine, an instruction is given out from the operation instruction circuit 11, and a reverse instruction 14 is applied from the position-speed control circuit 5 to the inverter driving circuit 4 to start the inversion deceleration (generate inverting torque). As a result, the speed of the motor 1 decreases. When the speed of the motor has reached a level at which the motor can be stopped, the needle position sensor 8 mounted on the sewing machine 7 detects a stop position which is previously decided in the sewing machine 7, the upper portion or lower portion, which is determined by the sewing machine operating instruction circuit 11, of the needle of the sewing machine 7 is selected, and the inversion braking force is cut off to stop the sewing machine.

A machine operated in this manner must carry out several-switch sewing operations with a high frequency.

A motor used in a sewing machine is thus started and stopped very often, so that a large current flows therethrough every time the motor is started and stopped. Industrial sewing machines and Factory Automation Robots are required to start and stop high frequently. Since large torque is required and feed current becomes large in this type sewing machine at the time of acceleration or deceleration of the motor as disclosed in FIG. 2, the temperature of the motor 1, the driving circuit 4 and other constituting elements rise remarkably during the operation of these elements so that these elements are required to have large capacity for avoiding the temperature rising of these elements.

The above-mentioned prior publications do not discuss a permanent magnet type synchronous motor of a 120° electric PWM voltage control system in which the control of the lead and lag of current phase is done. At the same time, these publications do not discuss a control method of a motor which carries out acceleration or deceleration frequently, namely the motor, carries out normal rotation to reverse rotation very frequently.

FIG. 3 shows torque characteristics of a rotational phase of a permanent magnet type synchronous motor of a 120° electric PWM voltage control system which has protruded iron cores between the poles of permanent magnets of the rotor. In FIG. 3, the solid line shows a torque characteristic of a conventional permanent magnet type synchronous motor which does not have the protruded iron cores among the poles of permanent magnets of the rotor, and the dotted line shows a permanent magnet type synchronous motor of the present invention which has protruded iron cores (projecting poles) therebetween. Referring to FIG. 3, the permanent magnet type synchronous motor of the present invention having the projecting poles generates a large torque compared with the conventional permanent magnet type synchronous motor which lacks the projecting poles under the same applied current. A motor torque (⊕ torque) in the normal rotation region or in a state of braking in which the motor is changed from the reverse rotation region to the normal rotation region, is delayed in phase by α° compared with that of the conventional motor as can be seen in the large torque generation portion from $(30° + α°)$ to $(30° + α°) + (30°)$ in FIG. 3. Another motor torque (⊖ torque) in the reverse rotation region or in another state of braking in which the motor is changed from the reverse rotation region to the normal rotation region, is advanced by a phase β compared with that of the conventional motor as disclosed in another large torque generation portion from $\{(180°) - (30° - β°) - (30°)\}$ to $\{(180° - (30° - β°)\}$ in FIG. 3. As explained above, the conventional permanent magnet type synchronous motor which lacks the projecting poles has a drawback in that a large torque can not be attained. However, the above-mentioned prior publications do not discuss this point.

In the synchronous motors disclosed in the above-mentioned prior publications, consideration is not given to a temperature rise in the constituent parts and a lack of the resistance thereof to an increase in the current capacity, which would cause troubles when the accelerating and decelerating of the engine is done with frequency.

The construction of a rotor in a permanent magnet type synchronous motor to which the present invention is applied will now be described with reference to FIG. 4. Referring to the drawing, reference numeral 101 denotes a rotor as a whole, 102 a permanent magnet fixed to the outer circumferential portion of a rotor core 103, and 104 a detecting magnet adapted to determine a commutating period of a stator winding (not shown) and fixed to a motor shaft 105. As is clear from a sectional view along A—A line of FIG. 4, which is shown in FIG. 5, the permanent magnet 102 is divided into four equal parts which are bonded to the outer circumferential surface of the rotor core 103 with a bonding agent. The permanent magnets 102 may also be held on the outer circumferential surface of the rotor core 103 by a small-thickness cylindrical member of stainless steel. If both the bonding agent and cylindrical member are used, the permanent magnets can be fixed to the rotor core more firmly.

Referring to FIG. 4 the prior art detecting magnets 104 comprising a metal magnetized body are arranged in same angle and same polarity as the permanent magnets 102 facing to the side surface of the permanent magnets 102. If three phases are used for the stator coils, three magnetic pole detecting elements 30 are necessary on the magnetic pole sensor 2 as disclosed in FIG. 6.

A rotor in a conventional motor of this kind is constructed as shown in FIG. 4.

According to the construction of the rotor shown in FIG. 4, a large increase in reactance torque cannot be expected due to the reactance. The synchronous motor in which this problem is solved that is to increase the torque, are the synchronous motors disclosed in the previously-mentioned laid-open publications. However, even in these synchronous motors, for example, the reduction of cogging torque is not considered.

SUMMARY OF THE INVENTION

A first object of the present invention is to provide a permanent magnet type synchronous motor which is able to increase the reluctance torque and decrease the cogging torque of the motor.

A second object of the present invention is to provide a permanent magnet type synchronous motor which is able to utilize greatly improved reluctance torque in both normal rotation and reverse rotation of the motor.

A third object of the present invention is to provide a permanent magnet type synchronous motor which is able to provide simple magnet holding structures.

The first object mentioned above of increasing the reluctance torque and reducing the cogging torque can be achieved by a permanent magnet type synchronous motor having a stator provided with a plurality of slots, and a rotor disposed close to and in opposition to the stator so that the rotor can be rotated, the rotor consisting of a rotor core mounted fixedly on a motor shaft, and an even number of permanent magnets provided on a circumferential portion of the rotor core, characterized in that the rotor core has projecting portions among the permanent magnets, the width of each of the projecting portions being set different from the pitch of the slots in the stator.

The second object mentioned above of utilizing the reluctance torque can be achieved by a permanent magnet type synchronous motor having a stator provided with a plurality of slots, and a rotor disposed close to and in opposition to the stator so that the rotor can be rotated, the rotor consisting of a rotor core mounted fixedly on a motor shaft, and an even-numbered permanent magnets provided on a circumferential portion of the rotor core, the stator having detectors for determining the positions of the permanent magnets on the rotor, characterized in that the position detectors consist of two sets of position detectors, i.e. position detectors for the normal rotation of the motor, and position detectors for the reverse rotation of the motor, the two sets of position detectors having a predetermined phase difference as explained later. Since the two sets of position detectors comprise the detectors for the normal rotation and the reverse rotation, the corresponding two sets of position detecting signals of either ⊕ torque or ⊖ torque concerning FIG. 3 explained before, have to be proceeded in a pattern generating circuit for discriminating these signals into the normal rotation signal at normal rotation and the reverse rotation signal at reverse rotation in a pattern generating circuit as explained later to operate the driving circuit correctly in the normal rotation and reverse rotation, respectively, using the projecting poles such as shown in FIG. 7, generating a large torque and shifting the phase as shown in FIG. 3 compared with the conventional motor shown in FIG. 5.

The third object of providing simple magnet holding structures can be achieved by a permanent magnet type synchronous motor having a stator provided with a plurality of slots, and a rotor disposed close to and in opposition to the stator so that the rotor can be rotated, the rotor consisting of a rotor core mounted fixedly on a motor shaft, and an even-numbered permanent magnets provided on a circumferential portion of the motor core, characterized in that the rotor core has protruded portions among the permanent magnets, members for holding the permanent magnets being provided at the free ends of the protruded portions.

In these motors, since the protruded portions have a magnetic collecting effect, the reluctance torque is increased especially at the starting time and the cogging torque is decreased.

Since two sets of position detectors can be arranged in each of these motors so that the position detector sets have a phase difference with respect to the normal and reverse rotations thereof, the characteristics of the motor can be improved.

The phase difference explained above is proportional to the commutating current. An effectual normal or reverse rotational operation can be performed by detecting the phase difference previously and commutating the current to the stator by shifting an input signal to the driving circuit corresponding to the rotational magnetic pole detecting signal and the normal or reverse operating instruction.

The magnet holding members, parts of the projecting portions, work so as to press the magnets from the outside. Therefore, it becomes unnecessary to prepare any other magnet holding parts separately, and this enables the construction of the motor to be simplified.

DETAILED DESCRIPTION OF THE PREFERRED EMBODIMENTS

The construction of a rotor in the present invention which is capable of attaining high torque and low cogging torque will now be described with reference to FIG. 7.

Figure 5:
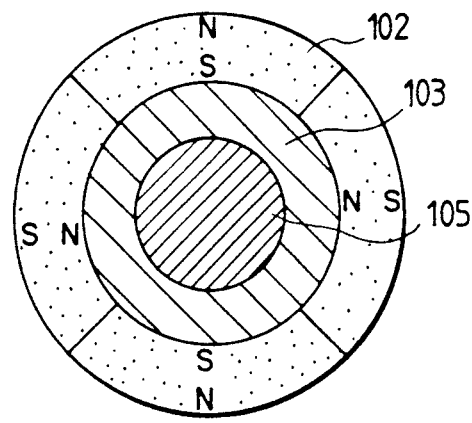
FIG. 5 shows a sectional view along A—A line shown in FIG. 4.
Figure 7:
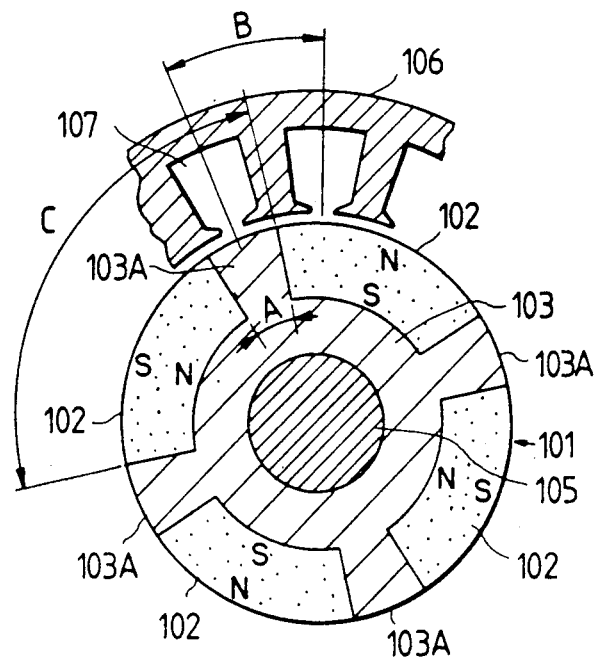
FIG. 7 shows a plane view of a rotor showing one embodiment of the present invention.

The difference between the rotor shown in FIG. 7 and the conventional rotor of FIG. 5 resides in that projecting portions 103A formed by projecting parts, or to be exact, four parts, of the outer circumferential region of a rotor 103 consisting of a material of a high magnetic permeability are interposed among permanent magnets 102. The outer circumferential surfaces of the projecting portions 103A are flush with those of the permanent magnets 102.

Since the projecting portions 103A consist of laminated silicon steel plates, the same material as that of the rotor core 103, the magnetic permeability thereof is higher than that of the permanent magnets 102.

Figure 8:
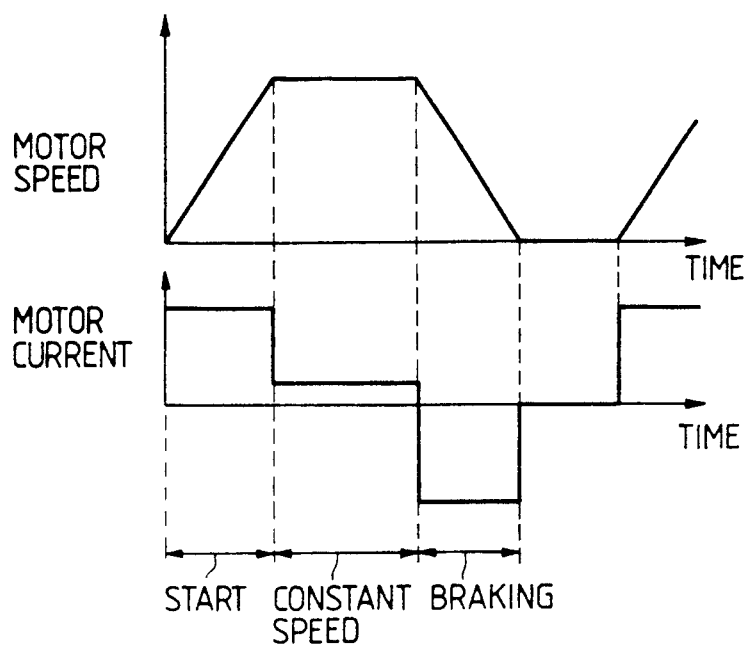
FIG. 8 shows a relation between motor speed and current in the embodiment of the present invention.
Figure 9:
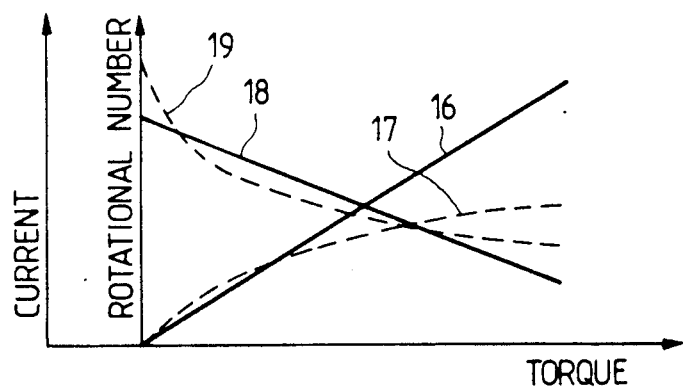
FIG. 9 shows a characteristic comparison diagram between the motor of the present invention having the projecting poles and the prior art having no projecting poles.

Accordingly, the torque constant of the motor when an electric current of a high amperage is used, i.e., at motor starting and the brake applying time when reverse rotation torque is applied, can be improved to a great extent. FIG. 8 shows the relation between the motor speed and electric current. FIG. 9 is a comparative characteristic diagram showing the relation between the torque and the electric current of the conventional motor shown by the solid line 16 and the motor of the present invention shown by the dotted line 17, and showing the relation between the torque and number of revolutions per minute of the conventional motor shown by the solid line 18 and the motor of the present invention shown by the dotted line 19.

It has been ascertained that, in a motor, the amperage at the starting and braking time generally reaches a level several times as high as that at the time of constant speed rotation, and this fact is known widely.

If the torque characteristics at the starting and braking time at which a large motor current flows can be improved, the efficiency is improved, and the influence of heat can be minimized.

The projecting portions 103A of the present invention shown in FIG. 7 have a magnetism collecting effect, so that the quantity of magnetic flux between the projecting portions 103A and stator when a large current is applied. Consequently, the present invention has such a result that the above-mentioned effect is especially great when a large current is applied. In FIG. 9, torque is taken in the direction of the lateral axis, and electric current and number of revolutions per minute in the direction of the vertical axes, and it is clear from the drawing that the present invention is superior to the conventional motor as mentioned above.

The present invention is thus capable of greatly improving the torque characteristics displayed when a large current is applied. The construction for reducing the cogging torque will now be described.

The magnitude of the overall cogging torque in a motor of this kind is proportional to the magnetic flux density. Accordingly, a projecting pole ratio, i.e. a ratio of the angle of the projecting portion 103A to the sum of the angles of the permanent magnet 102 and projecting 103A decreases as A/C in FIG. 7 becomes large.

The number of occurrences of cogging torque per revolution of a magnet is determined fundamentally on the basis of the numbers of poles of a rotor and a stator. However, it is considered that this number of occurrence of cogging torque finally reaches a level corresponding to the number of the projecting poles of the stator, in view of a case where the numbers of the poles are the same, with one phase winding set around a plurality of projecting poles.

Figure 10:
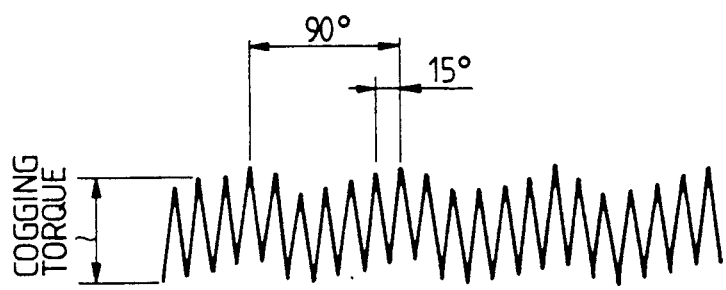
FIG. 10 illustrates a condition of occurrence of a cogging torque.

For example, in the case where the numbers of poles of a rotor and the numbers of slots to which the stator windings stagger are four and six, respectively, cogging torque occurs $4 \times 6 = 24$ times per revolution of the magnet. This cogging torque occurs in every fifteen, which is a quotient obtained by dividing one revolution (360°) by 24, degrees of movement of the rotor as shown in FIG. 10. Referring to FIG. 7, reference numeral 106 denotes a stator core, and 107 slots. Reference letter B denotes a distance (angle) between two adjacent slots, i.e. the pitch of the slots. The cogging torque occurs in the combination of the slots and the permanent magnets. In the B region shown in FIG. 7, the variation of the cogging torque grows frequently as shown in FIG. 10.

Therefore, if the magnetic flux density variation at the slots 107 is reduced to a low level, the occurrence of cogging torque decreases. The problem of reduction of the magnetic flux density variation can be solved by setting different the pitch B of the slots and the angle A of a projecting portion 103A.

The relation between the pitch B of the slots and the angle A of a projecting portion is expressed by the inequality.

$$B \neq nA \quad (1)$$

where n is an integer not less than one.

Figure 11:
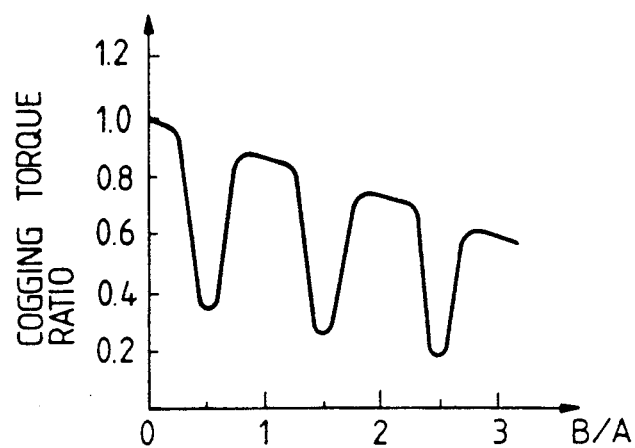
FIG. 11 is a graph showing a relation between the width of a projecting pole and cogging torque.

The inventors of the present invention made experiments to determine the variation of cogging torque with respect to the ratio B/A to find out that the cogging torque and B/A ratio had the characteristics shown in FIG. 11. The vertical axis of FIG. 11 represents the magnitude of cogging torque, and a base magnitude of 1.0 is the magnitude of cogging torque occurring in the rotor having no projecting portions shown in FIG. 5, the graduations on this axis being determined at a predetermined rate on the basis of the base magnitude. The lateral axis of FIG. 11 represents a ratio of the pitch B of the slots to the angle A, i.e. B/A.

As is clear from the results of the experiments, it has been ascertained that, when the pitch B of the slots has an integral multiple of the width of projecting portion 103A, large cogging torque occurs. When B/A is 0.5, 1.5 and 2.5, the cogging torque decreases greatly.

$$A = (n + 0.5)B \quad (2)$$

where n is an integer.

Namely, the cogging torque cannot be reduced by merely arranging the projecting portions 103A among the permanent magnets 102. The reduction of cogging torque cannot be effected unless the projecting portions 103A and slots are arranged so that the width of each projecting portion and the pitch B of the slots have predetermined relation. The inventors of the present invention have ascertained that the cogging torque in the embodiment of the present invention decreases to $\frac{1}{4} - 1/5$ of that in a conventional motor of this kind by satisfying the above-mentioned formula (2).

Figure 12:
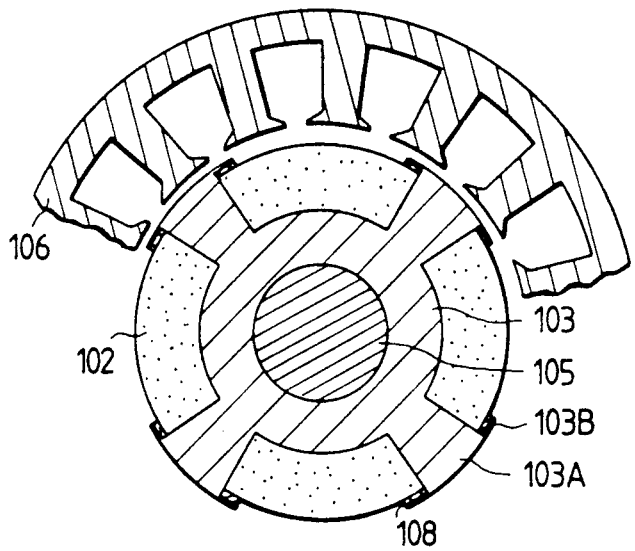
FIG. 12 is a front elevation showing magnet holding members provided on the protruded portions.
Figure 13:
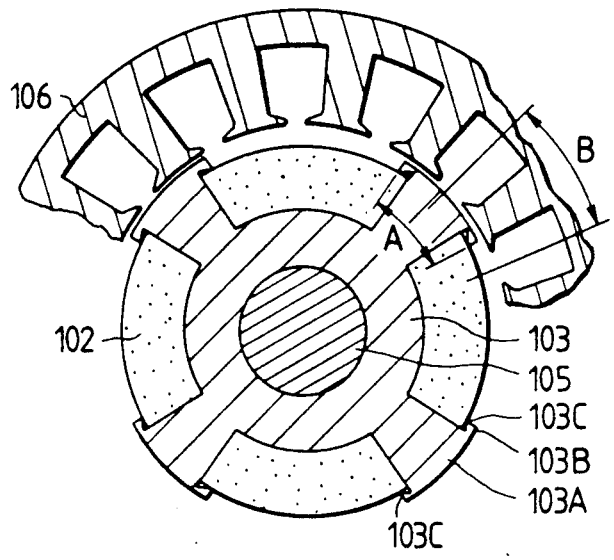
FIG. 13 is a construction diagram of a modified rotor also having magnet holding members.

It is possible that a permanent magnet type synchronous motor of the present invention can be operated at a high speed or rotated at tens of thousands of times per minute compared with the conventional motor in this field, and the motor of the present invention can be extensively used. If the adhesion and bonding strength of the permanent magnets 102 and that of the rotor core are low, the permanent magnets fly off during a rotation of the motor to result in a grave accident. We, the inventors, discussed in various aspects a simple structure for improving the bonding strength of the permanent magnets 102 and the rotor core 103. Examples of this structure are shown in FIGS. 12 and 13. In the example of FIG. 12, the magnet holding members 103B are formed unitarily with the projecting portions 103A so as to extend in the circumferential direction of these projecting portions 103A. Each of these magnet holding members 103B works literally so as to hold the magnets 102 on both sides thereof from the side of the outer circumferences thereof. The distance between the rotor core 103 and a magnet holding member 103B, i.e. the radial size of a magnet retaining portion is set slightly larger than that of a permanent magnet 102, so that the magnets can be fixed to the rotor core more easily. After the magnets have been fixed to the rotor core, intervening members 108 consisting of a plastic, hard rubber or a spring material are inserted in the clearances between the permanent magnets 102 and magnet holding members 103B to complete the assembling of the rotor 101.

In this intervening member fixing operation, a conventional bonding method and a conventional cylindrical holding member can also be used without any troubles.

FIG. 13 shows a structure for combining permanent magnets 102 with a rotor core 103 without using the intervenient members 108 used in the example of FIG. 12. Referring to FIG. 13, reference numeral 103C denotes claws formed integrally with magnet holding members 103B. The distance between the center of the rotor core and an end of a claw 103C is set slightly shorter than that between the center of the rotor core and the corresponding portion of the outer circumference of the relative permanent magnet 102. The permanent magnets 102 are pressure-fitted in their axial direction into the rotor core 103 by utilizing the flexibility and elasticity of the rotor core 103, to complete the assembling of the rotor.

According to this structure, the number of parts does not increase, and the number of the manufacturing steps decreases, the construction being simplified.

In both of the structures of FIGS. 12 and 13, the sizes of the projecting pole portions 103A are set so as to reduce the cogging torque. In these examples, the size A of a projecting pole portion 103A is set equal to the width of a magnet holding member 103B.

According to the present invention thus constructed, especially, the starting torque is improved greatly, and the cogging torque is reduced. Moreover, the permanent magnets can be fixed simply, and the bonding strength of the permanent magnets and rotor combined in the mentioned manner is also improved to a high degree.

The permanent magnet type motors having a rotor of the above-described construction can be divided into motors provided with a mechanical brush, and motors having no such brush, so-called brushless motors.

A brushless motor is adapted to be rotated by applying an electric current threto with the pole winding selectively shifted in accordance with the position of the rotor, and, therefore, it is essential that this motor be provided with a detector for determining the position of the rotor.

A position detector consists of a magnetic detecting element adapted to detect a permanent magnet 102 on the rotor 101. There are various kinds of elements used as the magnetic detecting element, which include generally used elements, such as a magnetic resistance effect element and a Hall IC.

Figure 3:
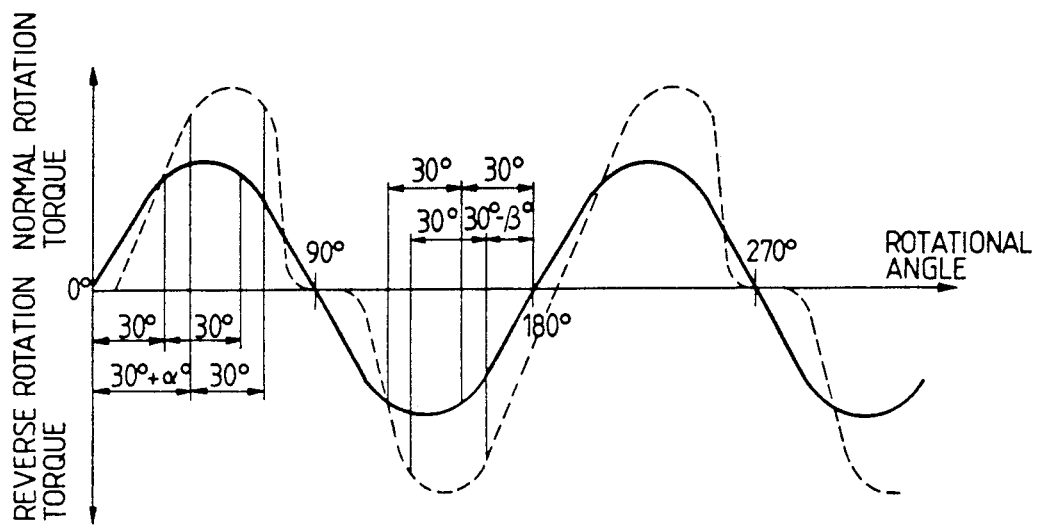
FIG. 3 shows a relation between rotational angle and torque in one phase of the prior permanent magnet type synchronous motor and one embodiment of the present invention.
Figure 4:
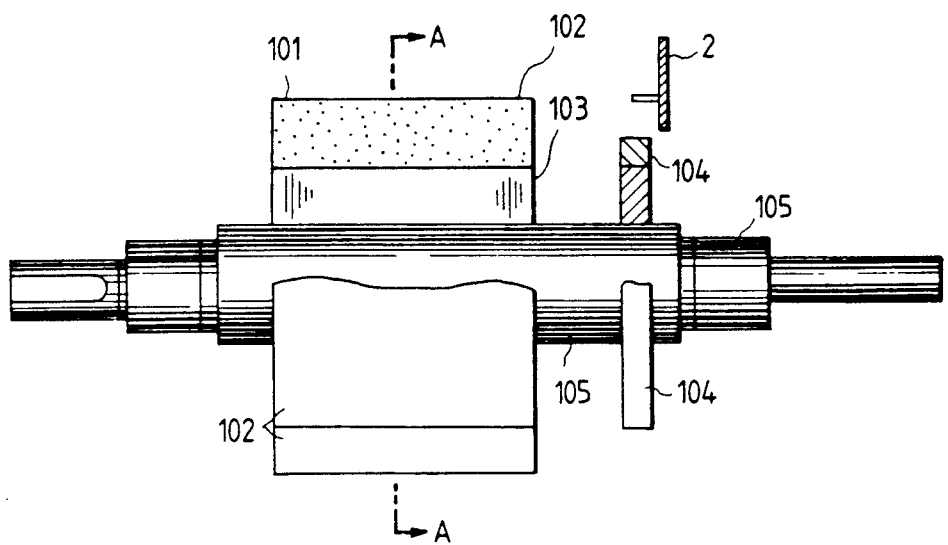
FIG. 4 illustrates a positional relationship between the rotor and the magnetic pole sensor.
Figure 14:
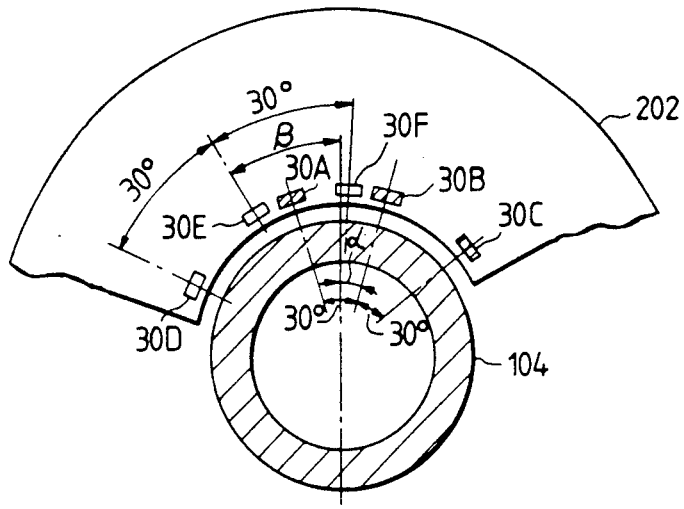
FIG. 14 is a diagram showing the relation between a detecting magnet and the magnetic pole sensors.
Figure 21:
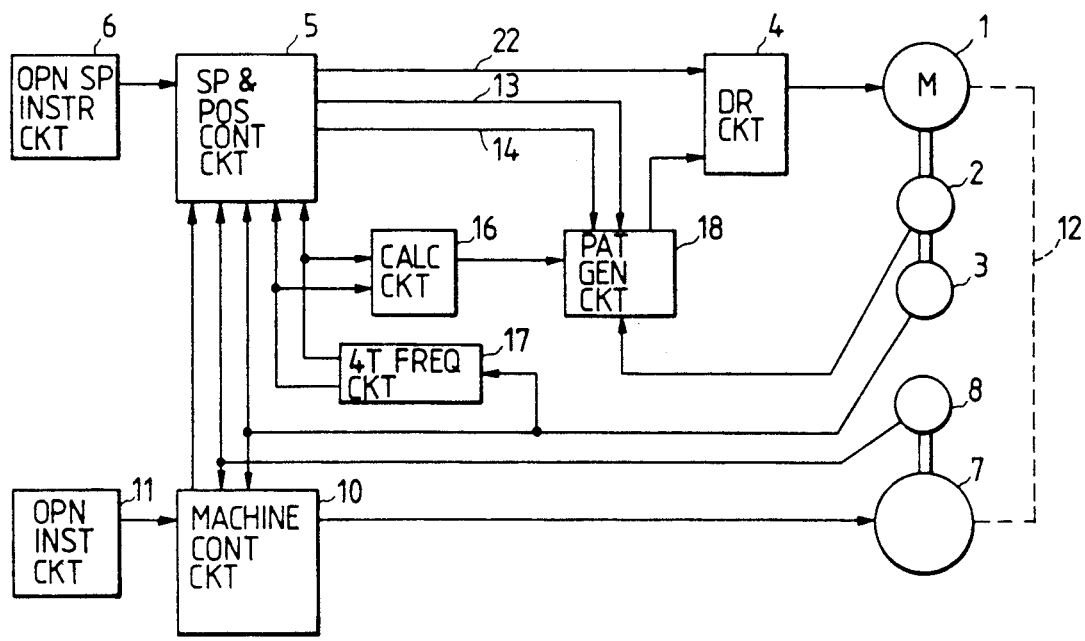
FIG. 21 illustrates a block diagram in which the present invention is applied.

FIG. 14 shows the arrangement of magnetic detecting elements of the present invention consisting of Hall IC's. Referring to the drawing, a set of Hall IC's consisting of three hatched 30°-shaped Hall IC's 30A, 30B, 30C are position sensors for the normal rotation of the rotor, and non-hatched Hall IC's 30D, 30E, 30F position sensors for the reverse rotation of the rotor. The normal-rotation position sensor set are advanced from the center line by $\alpha°$, and the reverse-rotation position sensor set are delayed from the center line by $\beta°$. Namely, the normal-rotation position sensor set and reverse-rotation position sensor set are arranged as they are staggered from each other by $\alpha + \beta$ (degrees). When a signal from a set of position detectors in a permanent magnet type motor, especially, a brushless motor is used as a signal for switching pole windings for the normal and reverse rotations of the rotor, various kinds of performance of the motor, for instance, current-torque characteristic generally becomes different during the normal rotation of the rotor and during the reverse rotation thereof as apparent from the explanation concerning FIG. 3. Accordingly, when a load apparatus which require to be rotated normal and reverse is operated by a motor having only one set of position sensors, the speed during the normal rotation of the rotor and that during the reverse rotation thereof do not agree, and various other troubles occur. The position sensors provided so as to solve these problems are such that as shown in FIG. 14 and referred to above. According to these position sensors, reverse-rotation position sensor set are provided in addition to the normal-rotation position sensors used while the rotor is rotated normal, these reverse-rotation position sensors being arranged in a staggered manner with respect to the normal-rotation position sensors. This quantity of stagger, i.e. the angle $\alpha + \beta$ is, of course, set selectively to a suitable level so that the normal-rotation characteristics of the motor and the reverse-rotation characteristics thereof agree with each other. Therefore, when an apparatus shown in FIG. 21 is explained later is driven by the improved rotor shown in FIG. 7 and the magnetic pole sensor or the rotation position sensor 202 shown in FIG. 14, large increasing of the torque caused by the reluctance torque and decreasing of the cogging torque can be attained in normal and reverse rotation of the motor of the present invention.

Figure 15:
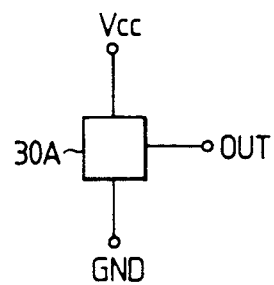
FIG. 15 is a connecting diagram of a conventional position detector.

In general, a Hall IC has a three-terminal structure as shown in FIG. 15. Referring to the drawing, reference letters Vcc denotes a DC power source terminal, and GND a ground terminal, an output corresponding to the variation of internal electric resistance due to the external magnetic field being outputted from an output terminal OUT.

Figure 16:
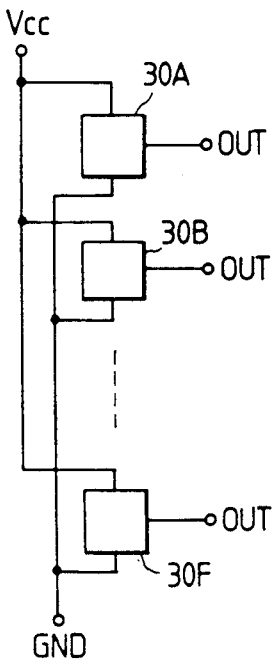
FIG. 16 is a connecting diagram of position detector applied to the present invention.

A single Hall IC element usually has three terminals as mentioned above. Therefore, when six Hall IC's are provided as shown in FIG. 14, a total of eighteen terminals are required, so that the circuit becomes complicated. A circuit solving this problem is shown in FIG. 16. As is clear from this drawing, the number of terminals (wires) is decreased to eight by using a DC power source terminal Vcc and a ground terminal GND in common. This enables the circuit to be simplified.

Figure 17:
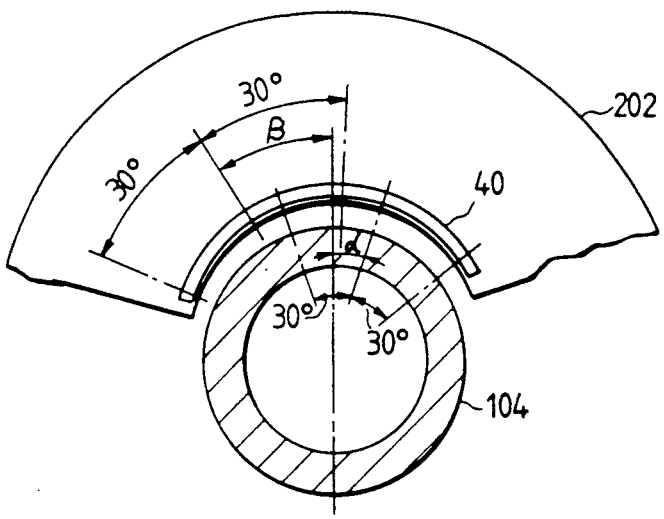
FIG. 17 is a modified embodiment shown in FIG. 14.

It is desirable that all Hall IC's be molded on a single substrate 40 as shown in FIG. 17. Namely, when a substrate is used in common, all (six) Hall IC's can be positioned by one regulating operation. This enables a Hall IC positioning operation to be simplified, and the element supporting strength to be improved, so that positioning sensors having excellent vibration resistance can be obtained.

Figure 18:
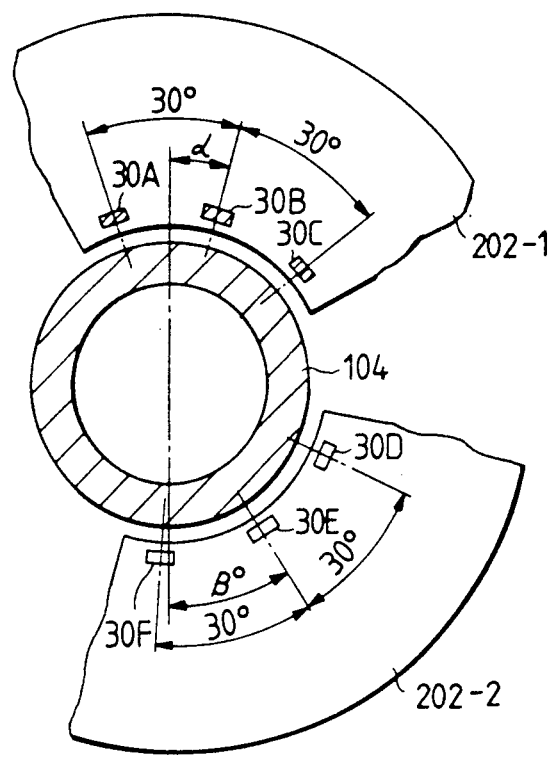
FIG. 18 is a diagram showing one embodiment of the magnetic pole sensor in which normal rotation sensors and reverse rotation sensors are provided.
Figure 19:
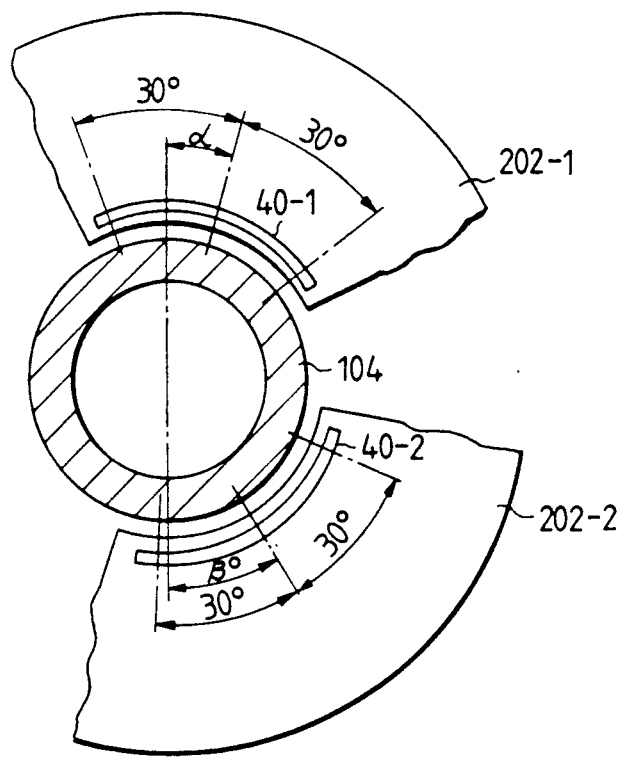
FIG. 19 is a modified embodiment shown in FIG. 18.

FIGS. 18 and 19 correspond to FIGS. 14 and 17, respectively. The difference between FIGS. 18, 19 and FIGS. 14, 17 is that the former constitutes the magnetic pole sensor by two sets of sensors of 202-1 and 202-2, and the latter constitutes the magnetic pole sensor by one set of sensor 202.

In a conventional motor of this kind having no projecting portions 103A, in which a large current flows as shown by a solid line 16 in FIG. 9, the starting torque 18 is comparatively small. If the projecting portions 103A shown in FIG. 7 are provided among the permanent magnets 102 as in the present invention, the starting torque is improved greatly owing to the magnetism collecting effect.

Figure 20:
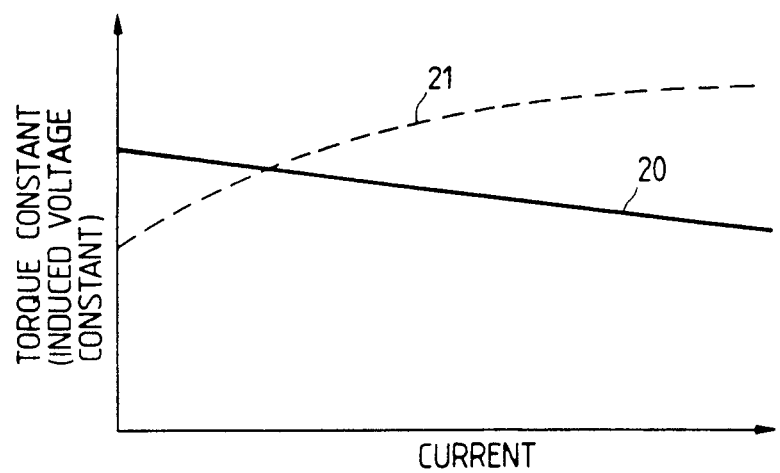
FIG. 20 is a graph showing a relation between a torque constant and a feed current.

The relation between the conducting current to the stator and the torque constant is as follows. When the conducting current becomes large, the torque constant of the present invention, which has the projecting poles 103, becomes large as shown by the dotted line 21 in FIG. 20. On the contrary, in the conventional permanent magnet type synchronous motor which has not the projecting poles, when the conducting current to the stator becomes large, the torque constant becomes small as shown by the solid line 20 in FIG. 20. Namely, the characteristic of the induced voltage constant of the conventional permanent magnet type synchronous motor decreases corresponding to the conducting current as shown by the solid line 20 in FIG. 20 based on an influence of the inductance of the stator. On the other hand, in the case of the projecting poles as shown in FIG. 7 of the present invention, when the conducting current to the stator is increased, the magnetization effect of the armature reactance is glown so that the induced voltage constant becomes large when the conducting current to the stator becomes large as mentioned above. As a result, the motor of the present invention causes the increase of the induced voltage constant and causes the increase of the torque constant so that large torque is generated as shown by the dotted line in FIG. 3. For using the large torque effectively attained in such a way, a control circuit shown in FIG. 21 is utilized.

Figure 1:
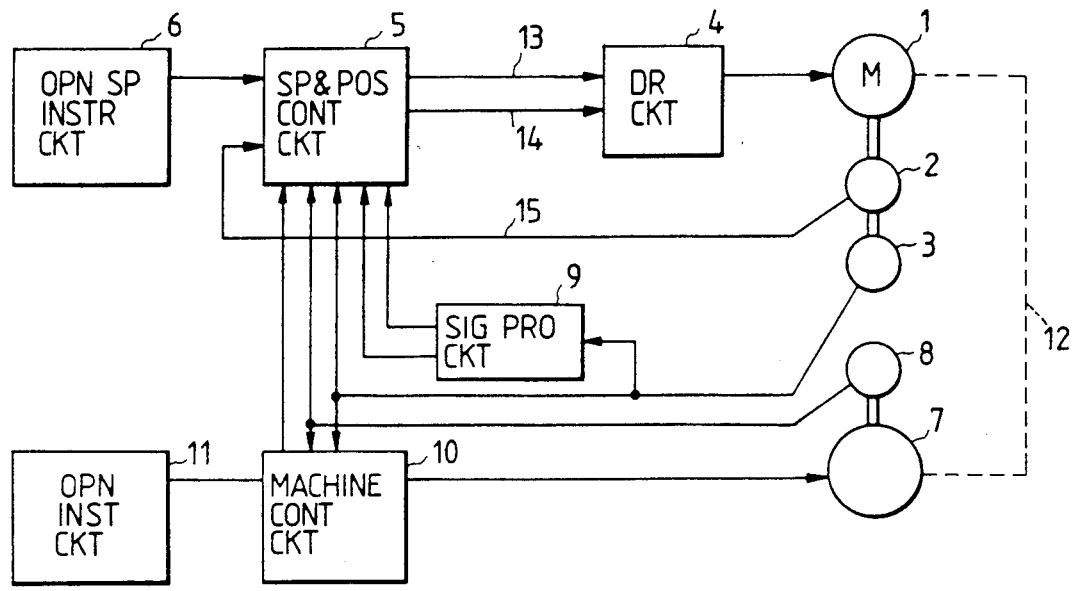
FIG. 1 illustrates a block diagram for explaining a control method of a prior permanent magnet type synchronous motor.
Figure 2:
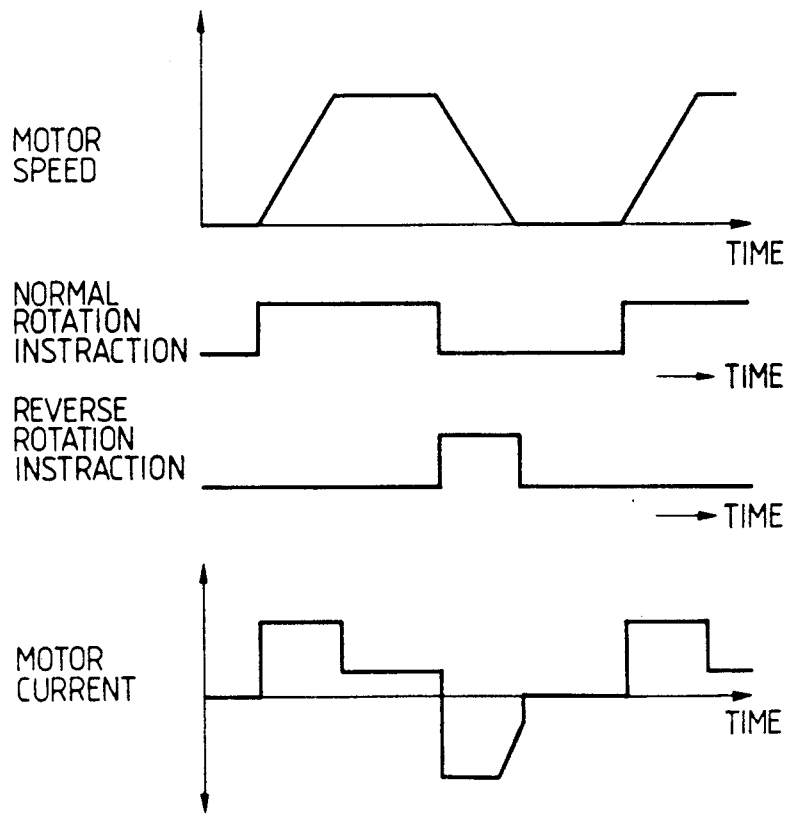
FIG. 2 is a diagram for explaining an operational condition of the prior permanent magnet type synchronous motor shown in FIG. 1.

In FIG. 21, the same parts as in FIG. 1 are indicated by the same symbol. The output signal of the magnetic pole sensor 2 is inputted to the pattern generating circuit 18. The output signal of the rotary encoder 3 is inputted to the four times frequency circuit 17. Although the four times frequency circuit 17 is used for increasing the resolution in the speed-position control circuit 5 and the calculating circuit 16, a conventional frequency circuit can be used instead. The calculating circuit 16 is used for calculating, for instance, a position of the reverse rotation sensor 30D based on another position of the normal rotation sensor 30A when the motor rotational direction is switched from the normal rotation to the reverse rotation. The pattern generating circuit 18 is used for switching the start position of the motor. Namely, when the motor rotational direction is switched from the normal rotation to the reverse rotation, the pattern generating circuit 18 outputs a control signal to the driving circuit 4 to start from $180° - \{(30° - \beta°) + 30°\}$ to $\{180° - (30° - \beta°)\}$ of one phase, for instance, in U phase among three phase. When the motor rotational direction is switched from the reverse rotation to the normal rotation, the pattern generating circuit 18 outputs another control signal to the driving circuit 4 to start from $\{30° + \alpha°\}$ to $\{(30° + \alpha°) + 30°\}$ in one phase, for instance, in U phase among three phase. The driving circuit 4 is driven by the control signal of the pattern generating circuit 18 and the pulse width modulation signal from the speed-position control circuit 5.

For using effectively the high torque which is obtained by the projecting structure of the rotor shown in FIG. 7, it is necessary to change the conducting position of current to the stator. The decision of the conducting position of current to the stator is carried out by the pattern generating circuit 18. Since the rotational position of the motor can be known based on the calculating value of the rotary encoder 3 and the magnetic pole sensor 2, the conducting position of current to the stator can be decided by the rotational position.

Figure 6:
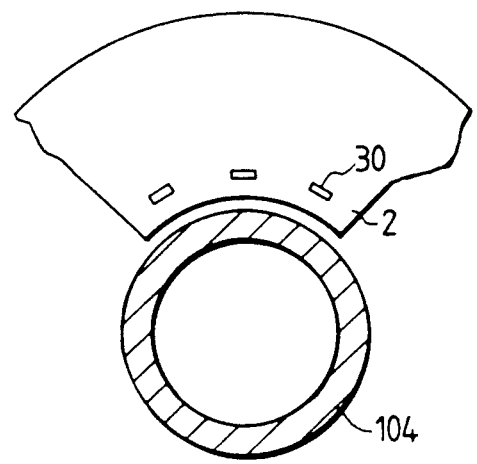
FIG. 6 illustrates a plane view of a conventional magnetic pole sensor.

According to the control system shown in FIG. 21, the present invention can obtain a large torque in such a manner that the torque delayed by $\alpha°$ is obtained compared with the conventional torque sensors shown in FIG. 6 in the normal rotation and the torque advanced by $\beta°$ is obtained compared with the conventional torque sensors in the reverse rotation by setting the magnetic pole sensors of the present invention as well as the conventional ones.

According to the structure and control method of the present invention, large torque constant can be obtained in normal and reverse rotation flowing large current to the stator and utilizing magnetizing effect of the armature reaction so that the characteristic shown by the dotted line in FIG. 9 can be obtained.

Since the width (angle) of each of the projecting portions 103A is set so as to have predetermined relation with the pitch B of the slots, the cogging torque can be reduced greatly as shown in FIG. 11.

The motor to which the present invention is applied consists of a generally used rotary type motor, and the present invention can also be applied to a linear motor in the same manner.

As described above, according to the first invention by which the first object of the present invention is achieved, parts of the rotary core are projected among the permanent magnets to form projecting portions in the mentioned positions, and the width of each projecting portion is set different from the pitch of the slots in the stator compared with the conventional motor which has not the projecting poles. Therefore, the torque at the starting time increases greatly, and the cogging torque decreases.

According to the second invention by which the second object of the present invention is achieved, two sets of position detectors, i.e. a normal-rotation position detector set and a reverse-rotation position detector set are provided, which are arranged with a phase difference set between the detector sets, so that the characteristics of the motor during the normal rotation period and reverse rotation period are all excellent, and scatter of the characteristics in these periods decreases to a low level.

According to the third invention by which the third object of the present invention is achieved, parts of a rotary core are projected among the permanent magnets to form projecting portions in the mentioned positions, and members for holding the permanent magnets are formed at the ends of these projecting portions, so that the permanent magnets can be held by simply-constructed members.

What we claim is:

1. A permanent magnet type synchronous motor having a stator provided with a plurality of slots, and a rotor disposed substantially close to and in opposition to said stator so that said rotor can be rotated, said rotor comprising a rotor core mounted fixedly on a motor shaft, with an even number of permanent magnets each having a single polarity in the circumferential direction and being provided on a circumferential portion of said rotor core, said rotor core including a plurality of projecting portions which are formed by projecting parts of an outer circumferential region of said rotor core and project between said permanent magnets, each boundary surface formed by respective ones of the projecting portions and the permanent magnets extending along a radius of said rotor, and the width (A) of each of said plurality of projecting portions being set different from the pitch of said slots in said stator.

2. A permanent magnet type synchronous motor having a stator provided with a plurality of slots, and rotor disposed substantially close to and in opposition to said stator so that said rotor can be rotated, said rotor comprising a rotor core mounted fixedly on a motor shaft, with an even number of permanent magnets each having a single polarity in the circumferential direction and being provided on a circumferential portion of said rotor core, said rotor core including a plurality of projecting portions which project between said permanent magnets, the width (A) of each of said plurality of projecting portions being set different from the pitch (B) of said slots in said stator, wherein the width A of said plurality of projecting portions is set so as to substantially satisfy the equation, $$A = (N + \tfrac{1}{2})B$$

wherein B is the pitch of said slots and n an integer.

3. An electric sewing machine provided with a permanent magnet type synchronous motor, said synchronous motor comprising a stator provided with a plurality of slots, and a rotor disposed substantially close to and in opposition to said stator so that said rotor can be rotated, said rotor comprising a rotor core mounted fixedly on a motor shaft with an even number of permanent magnets each having a single polarity in the circumferential direction and being provided on a circumferential portion of said rotor core, said rotor core having projecting portions which are formed by projecting parts of an outer circumferential region of said rotor core and project between said permanent magnets, each boundary surface formed by respective ones of the projecting portions and the permanent magnets extending along a radius of said rotor, and the width of each of said projecting portions being set different from a pitch of said slots in said stator.

4. A permanent magnet type synchronous motor having a stator provided with a plurality of slots, and rotor disposed substantially close to and in opposition to said stator so that said rotor can be rotated, said rotor comprising a rotor core mounted fixedly on a motor shaft, with an even number of permanent magnets each having a single polarity in the circumferential direction and being provided on a circumferential portion of said rotor core, said rotor core including a plurality of projecting portions which project between said permanent magnets, the width (A) of each of said plurality of projecting portions being set different from the pitch (B) of said slots in said stator, means for determining the positions of said permanent magnets on said rotor, said determining means including at least two sets of position detectors having a predetermined phase difference, wherein one of said at least two sets of position detectors is utilized during a normal rotation of said motor and another of said at least two sets of position detectors is utilized during a reverse rotation of said motor.

5. A permanent magnet type synchronous motor according to claim 4, wherein said at least two position detectors are arranged collectively on said stator.

6. A permanent magnet type synchronous motor according to claim 4, wherein said at least two position detectors are arranged separately on said stator.

7. A permanent magnet type synchronous motor according to claim 5, wherein said at least two sets of position detectors are fixed to a same substrate.

8. A permanent magnet type synchronous motor according to claim 1, wherein said plurality of projecting portions include means for holding said permanent magnets, said holding means being disposed on an outer circumferential portion of each of said plurality of projecting portion, said permanent magnets on opposite sides of a respective projecting portion being of different polarities.

9. A permanent type synchronous motor having a stator provided with a plurality of slots, and rotor disposed substantially close to and in opposition to said stator so that said rotor can be rotated, said rotor comprising a rotor core mounted fixedly on a motor shaft, with an even number of permanent magnets each having a single polarity in the circumferential direction and being provided on a circumferential portion of said rotor core, said rotor core including a plurality of projecting portions which project between said permanent magnets, the width (A) of each of said plurality of projecting portions being set different from the pitch (B) of said slots in said stator, wherein said plurality of projecting portions include means for holding said permanent magnets, said holding means being disposed on an outer circumferential portion of each of said plurality of projecting portions, said permanent magnets on opposite sides of a respective projecting portion being of different polarities, and wherein said resilient members are inserted between each of said holding means and said permanent magnets.

10. A permanent magnetic type synchronous motor having a stator provided with a plurality of slots, and rotor disposed substantially close to and in opposition to said stator so that said rotor can be rotated, said rotor comprising a rotor core mounted fixedly on a motor shaft, with an even number of permanent magnets each having a single polarity in the circumferential direction and being provided on a circumferential portion of said rotor core, said rotor core including a plurality of projecting portions which project between said permanent magnets, the width (A) of each of said plurality of projecting portions being set different from the pitch (B) of said slots in said stator, wherein said plurality of projecting portions include means for holding said permanent magnets, said holding means being disposed on an outer circumferential portion of each of said plurality of projecting portions, said permanent magnets on opposite sides of a respective projecting portion being of different polarities, and wherein claws are formed on each of said holding means, said permanent magnets being pressed by the resilient force of said claws.

11. A permanent magnet type synchronous motor according to claim 4, further comprising:
   a pattern signal generating circuit for generating a rotation instruction signal;
   a control circuit for producing a pulse width modulation signal corresponding to a magnetic pole position of said rotor; and
   a driving circuit responsive to said rotation instruction signal and said pulse width modulation signal for controlling the operation of said synchronous motor.

* * * * *